United States Patent
Hayama

(10) Patent No.: US 8,467,939 B2
(45) Date of Patent: Jun. 18, 2013

(54) MOTOR VEHICLE STEERING SYSTEM

(75) Inventor: Ryouhei Hayama, Nabari (JP)

(73) Assignee: JTEKT Corporation, Osaka (JP)

( * ) Notice: Subject to any disclaimer, the term of this patent is extended or adjusted under 35 U.S.C. 154(b) by 94 days.

(21) Appl. No.: 13/270,801

(22) Filed: Oct. 11, 2011

(65) Prior Publication Data

US 2012/0095648 A1 Apr. 19, 2012

(30) Foreign Application Priority Data

Oct. 13, 2010 (JP) .................................. 2010-230669

(51) Int. Cl.
*A01B 69/00* (2006.01)
*B62D 6/00* (2006.01)
*B62D 5/04* (2006.01)

(52) U.S. Cl.
USPC ............. 701/41; 180/443; 180/444; 180/445

(58) Field of Classification Search
USPC ..................................... 701/40; 180/443–447
See application file for complete search history.

(56) References Cited

U.S. PATENT DOCUMENTS

| | | | |
|---|---|---|---|
| 5,032,999 A * | 7/1991 | Finger et al. ..................... | 701/41 |
| 6,807,471 B2 * | 10/2004 | Fujimori .......................... | 701/41 |
| 2003/0028306 A1 | 2/2003 | Fujimori | |

FOREIGN PATENT DOCUMENTS

| | | |
|---|---|---|
| DE | 10 2004 040 975 A1 | 3/2006 |
| EP | 0 547 570 A1 | 6/1993 |
| JP | U-63-037381 | 3/1988 |
| JP | A 2003-048559 | 2/2003 |
| JP | B2-3883107 | 2/2007 |
| JP | A-2007-253640 | 10/2007 |
| JP | B2-3991632 | 10/2007 |

OTHER PUBLICATIONS

Oct. 30, 2012 Search Report issued in European Patent Application No. 11184630.9.

* cited by examiner

*Primary Examiner* — Thomas Tarcza
*Assistant Examiner* — Tyler J Lee
(74) *Attorney, Agent, or Firm* — Oliff & Berridge, PLC

(57) ABSTRACT

A motor vehicle steering system includes a knob that is for rotating a wheel of a steering member, has a knob center, and is supported rotatably around the knob center by the wheel. A control unit sets a predetermined period after detection of gripping on the knob by a grip detection device as a transfer period for transfer from reaction force application only by a wheel reaction force actuator to reaction force application only by a knob reaction force actuator. In the transfer period, the knob reaction force is increased with time and the wheel reaction force is reduced with time.

6 Claims, 8 Drawing Sheets

MOTOR VEHICLE STEERING SYSTEM

BACKGROUND OF THE INVENTION

1. Field of the Invention

The present invention relates to a motor vehicle steering system.

2. Description of Related Arts

There is proposed a motor vehicle handle position correcting device that corrects deviation between the position of a handle (the position of a knob in the circumferential direction of a handle wheel) and a tire turning angle in a so-called steer-by-wire system in which mechanical joining between a handle and steered wheels is cut off (for example, refer to Patent Document 1 listed below).

There is also proposed a steer-by-wire motor vehicle steering system that performs steering by using a joystick (for example, refer to Patent Document 2 listed below).

There is also proposed a steer-by-wire steering system that detects the position of a driver's hand gripping the steering wheel and corrects a steering reaction force of the steering wheel according to the position of the driver's hand (for example, refer to Patent Document 3 listed below).

There is also proposed an industrial vehicle power steering system that detects gripping on a knob by using a proximity switch or a touch switch (for example, refer to Patent Document 4 listed below).

Patent Document 1: Japanese Published Examined Patent Application No. 3991632 (Eleventh to twelfth paragraphs and 71st to 76th paragraphs of the specification, and FIG. 7 and FIG. 13)

Patent Document 2: Japanese Published Examined Patent Application No. 3883107 (Third to fifth paragraphs and 158th paragraph of the specification, and FIG. 18)

Patent Document 3: Japanese Published Unexamined Patent Application No. 2007-253640 (28th to 30th paragraphs of the specification, and FIG. 3 and FIG. 5)

Patent Document 4: Japanese Published Unexamined Utility Model Application No. S63-37381 (FIG. 1 and FIG. 3)

Generally, in a cargo-handling vehicle such as a forklift truck and a vehicle for handicapped, to enable a handle (steering wheel) operation by one hand, a rotatable knob is provided on a handle. For example, in a cargo-handling vehicle, a driver performs a handle operation by gripping the knob by his/her left hand while performing a lever operation for a cargo-handling operation by his/her right hand.

The driver may frequently exchange the handle and the knob and operate the handle and the knob in a switching manner, and in this case, a proper steering reaction force is demanded regardless of exchange.

SUMMARY OF THE INVENTION

An object of the present invention is to provide a motor vehicle steering system capable of applying a proper steering reaction force even when switching between steering using a knob and steering using a wheel of a steering member is performed.

An aspect of the present invention provides a motor vehicle steering system including a knob for rotationally operating a wheel of a steering member, the knob having a knob center and being supported rotatably around the knob center by the wheel, a wheel reaction force actuator that applies a wheel reaction force to rotation of the wheel, a knob reaction force actuator that applies a knob reaction force to rotation of the knob, a grip detection device that detects gripping on the knob, and a control unit that controls the knob reaction force actuator and the wheel reaction force actuator. The control unit sets a predetermined period after detection of gripping on the knob by the grip detection device as a transfer period for transfer from reaction force application only by the wheel reaction force actuator to reaction force application only by the knob reaction force actuator, and in this transfer period, increases the knob reaction force with time and reduces the wheel reaction force with time.

According to the present invention, a transfer period in which the knob reaction force is increased with time and the wheel reaction force is reduced with time is provided when a driver steers the motor vehicle by exchanging the wheel for the knob, so that application of the wheel reaction force can be smoothly switched to application of the knob reaction force. Therefore, a driver does not feel any physical disorder in steering when making an exchange.

DETAILED DESCRIPTION OF THE PREFERRED EMBODIMENT

A preferred embodiment of the present invention will be described with reference to the accompanying drawings.

Figure 1:
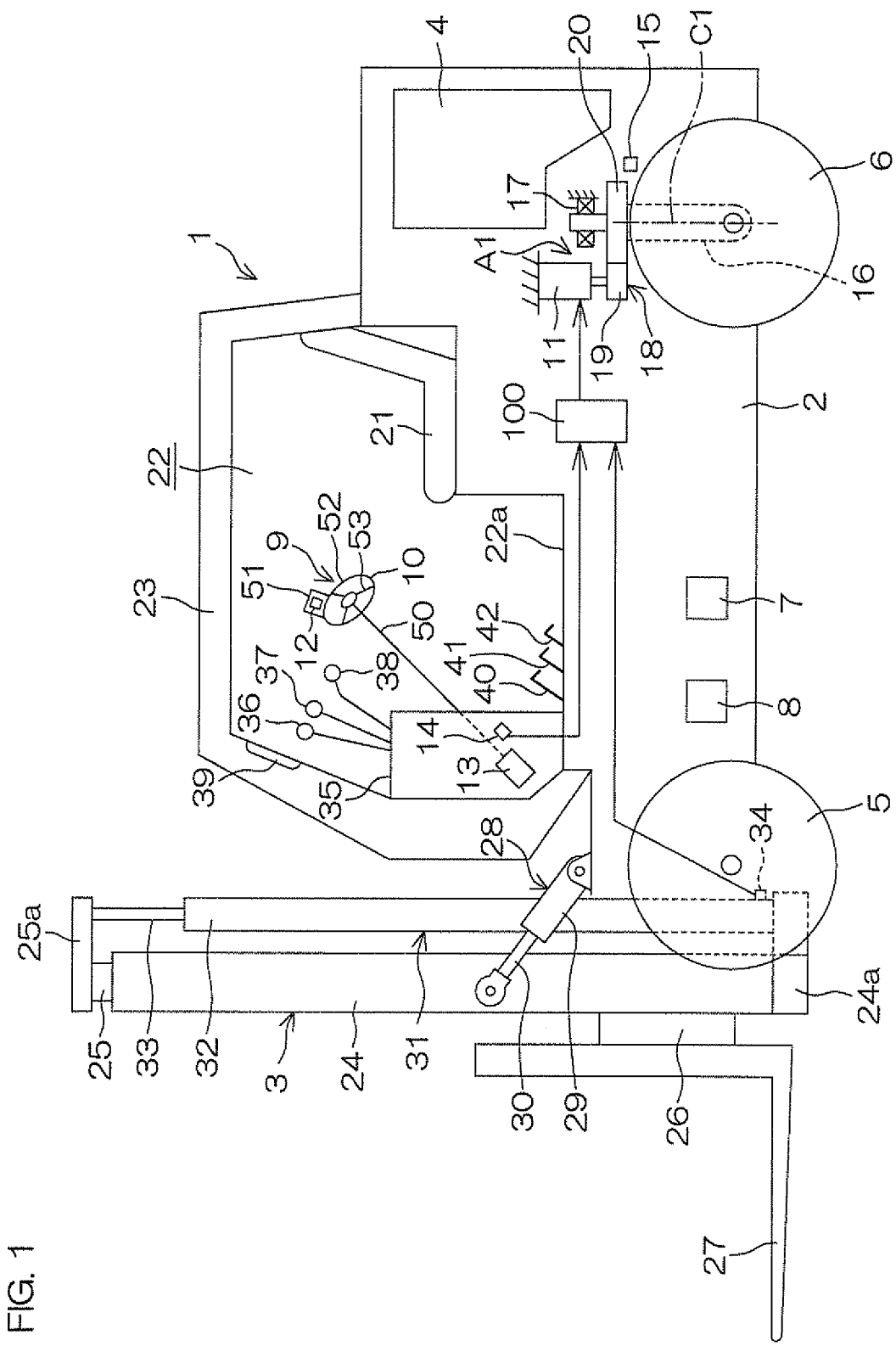
FIG. 1 is a schematic side view showing a general configuration of a forklift truck to which a motor vehicle steering system according to a preferred embodiment of the present invention is applied.

FIG. 1 is a schematic side view showing a general configuration of a forklift truck to which a motor vehicle steering system according to a preferred embodiment of the present invention is applied. Referring to FIG. 1, the forklift truck 1 includes a vehicle body 2, a cargo-handling machine 3 provided on the front portion of the vehicle body 2, a counter weight 4 provided on the rear portion of the vehicle body 2, front wheels 5 as drive wheels and a rear wheel 6 as a steered wheel which support the vehicle body 2, a drive source 7 of a vehicle including an engine, a hydraulic pump 8 as a hydraulic source, and a motor vehicle steering system 9 for turning the rear wheel 6.

The motor vehicle steering system 9 is configured as a so-called steer-by-wire motor vehicle steering system in which mechanical joining between a steering member 10 that is a hand-turned wheel and the rear wheel 6 as a steered wheel is cut off. As the steered wheel, a single rear wheel 6 may be provided at the center in the left-right direction of the vehicle body 2, or rear wheels 6 are provided on the left and right of the vehicle body 2. The steering member 10 is joined to the upper end of an inclined steering shaft 50 rotatably integrally.

To the steering member 10, a knob 51 for operating the steering member 10 is attached rotatably.

The motor vehicle steering system 9 includes the steering member 10, a turning actuator 11 that consists of, for example, an electric motor for turning the rear wheel 6 as a steered wheel according to an operation of the steering member 10, and driving of which is controlled by an ECU 100 (electronic control unit) as a control unit, a knob reaction force actuator 12 that applies a reaction force to the knob 51 attached rotatably to the steering member 10, and a wheel reaction force actuator 13 that applies a wheel reaction force (steering reaction force) to a wheel 52 of the steering member 10. In the present preferred embodiment, each of the knob reaction force actuator 12 and the wheel reaction force actuator 13 consists of an electric motor, and driving of these is controlled by the ECU 100.

The motor vehicle steering system 9 includes a wheel rotation angle sensor 14 as a wheel rotation angle detection device that detects a rotation angle (equivalent to a steering angle) of the wheel 52 of the steering member 10, and a steered angle sensor 15 that detects a steered angle of the rear wheel 6. The rear wheel 6 as a steered wheel is supported rotatably by a substantially vertical support member 16. The support member 16 is supported rotatably around a substantially vertical rotation axis C1 via a bearing 17 held on the vehicle body 2.

Rotation of an output shaft of the turning actuator 11 is decelerated via a transmission mechanism 18 and transmitted to the support member 16. This transmission mechanism 18 includes a drive member 19 consisting of, for example, a drive gear that rotates integrally with the output shaft of the turning actuator 11, and a driven member 20 consisting of, for example, a driven gear that is provided rotatably integrally with the support member 16 around the rotation axis C1 and meshes with the drive gear. The transmission mechanism 18 and the turning actuator 11 constitute a turning mechanism A1.

Power of a drive source 7 such as an engine is transmitted to a transmission that performs switching between forward traveling and backward traveling and a speed change operation via a torque converter, and is further transmitted to the left and right front wheels 5 (drive wheels) via a differential although this is not shown. The transmission includes a forward clutch and a backward clutch inside.

The forklift truck 1 includes an operator's cab 22 having a driver seat 21. The operator's cab 22 is formed to be surrounded by a frame 23 on the vehicle body 2.

The cargo-handling machine 3 includes a pair of left and right outer masts 24 supported by the vehicle body 2 so that the outer masts tilt around the lower end portions 24a, inner masts 25 supported by the outer masts 24 movably up and down, a lift bracket 26 supported by the outer masts 24 movably up and down, and a pair of left and right forks 27 attached to the lift bracket 26 as loading portions on which a cargo is loaded.

Between a predetermined portion of the outer mast 24 and a predetermined portion of the vehicle body 2, a tilt cylinder 28 is interposed. The tilt cylinder 28 includes a cylinder main body 29 that has an end joined swingably to the predetermined portion of the vehicle body 2, and a rod 30 that projects from the other end of the cylinder main body 29. The tip end of the rod 30 is joined swingably to the predetermined portion of the outer mast 24. According to an extending and contracting operation of the rods 30 of the tilt cylinders 28, the outer masts 24 are displaced to turn into an erecting posture and a tilting posture.

Further, lift cylinders 31 for moving up and down the inner masts 25 by using the outer masts 24 as guides are provided. The lift cylinder 31 includes a cylinder main body 32 fixed to the outer mast 24, and a rod 33 projecting from the cylinder main body 32. The tip end of the rod 33 is fixed to an attaching portion 25a provided on the predetermined portion of the inner mast 25.

To the lower portions of the cylinder main bodies 32 of the lift cylinders 31, weight sensors 34 as weight detection device for detecting load weights on the cargo-handling machine 3 are attached. Signals from the weight sensors 34 are input into the ECU 100.

At the front portion of the operator's cab 22, on the bottom surface 22a of the operator's cab 22, an operation stand 35 is provided, and at the rear portion of the operator's cab 22, the driver seat 21 is fixed.

On the operation stand 35, as a plurality of operation elements to be operated by a driver's hand, the steering member 10, an up/down operation lever 36 for moving up and down the forks 27, a tilting operation lever 37 for swinging the outer masts 24, and a forward/backward switching lever 38, are provided. To the operation stand 35, a confirmation mirror 39 for confirming mainly the back side is fixed. On the operation stand 35, various switches not shown are provided.

Near the base portion of the operation stand 35, on the bottom surface 22a of the operator's cab 22, as a plurality of operation elements to be operated by a driver's foot, an acceleration pedal 40, a brake pedal 41, and a clutch pedal 42 are provided. In actuality, the acceleration pedal 40, the brake pedal 41, and the clutch pedal 42 are arranged side by side in the direction perpendicular to the paper surface (equivalent to the left-right direction of the motor vehicle) and are schematically shown in FIG. 1. In FIG. 1, the layout of the up/down operation lever 36, the tilting operation lever 37, and the forward/backward switching lever 38 is also schematically shown.

Figure 2:
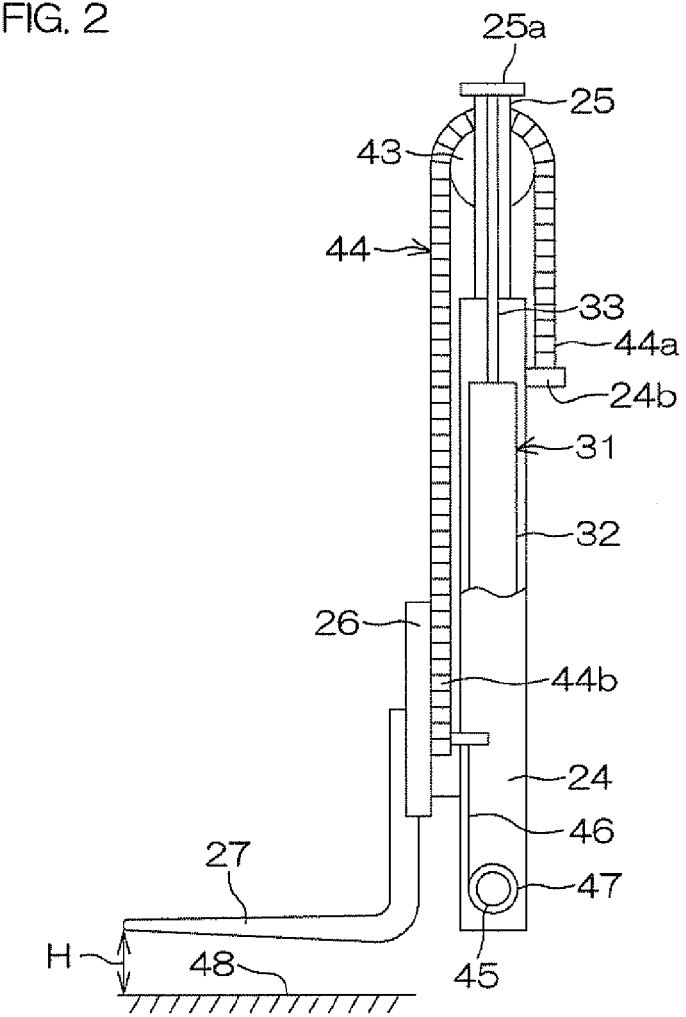
FIG. 2 is a general view for describing the operation principle for moving up and down forks.

Referring to FIG. 2 conceptually showing the operation principle for moving up and down the forks 27, on the upper portions of the inner masts 25, sprockets 43 are supported rotatably, and around the sprockets 43, chains 44 are wound. One ends 44a of the chains 44 are fixed to fixing portions 24b provided on the outer masts 24, and the other ends 44b of the chains 44 are fixed to the lift bracket 26. Accordingly, the lift bracket 26 and the forks 27 are suspended by using the chains 44.

When the inner masts 25 move up according to extension of the rods 33 of the lift cylinders 31, the sprockets 43 move up with respect to the fixing portions 24b of the outer masts 24, and move up the lift bracket 26 and the forks 27 as loading portions via the chains 44. The moving-up amount of the forks 27 with respect to the ground surface 48 is twice the extension amount of the rods 33 of the lift cylinders 31.

Stroke sensors 45 are provided as loading portion height detection device for detecting the heights of the forks 27 as loading portions, and signals from the stroke sensors 45 are input into the ECU 100. Rotary encoders may be used as the stroke sensors 45.

In detail, wires 46 one ends of which are latched on the other ends 44b of the chains 44 are reeled by wire drums 47 supported rotatably on the outer masts 24, and when the other ends 44b of the chains 44 move up or down together with the forks 27, the wires 46 are unreeled or reeled by the wire drums 47. At this time, the ECU 100 detects the numbers of rotations of the wire drums 47 by rotary encoders as the stroke sensors 45, and based on the detected values, calculates unreeled amounts of the wires 46 from the wire drums 47, and based on the calculated values, detects the loading portion heights H that are the heights of the forks 27 from the ground surface 48.

Figure 3:
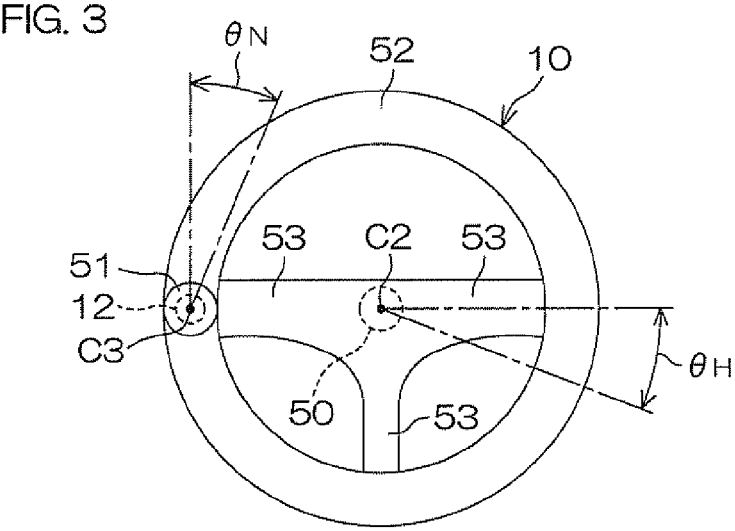
FIG. 3 is a general front view of a steering member, showing a steering member along the wheel center of the steering member.
Figure 4:
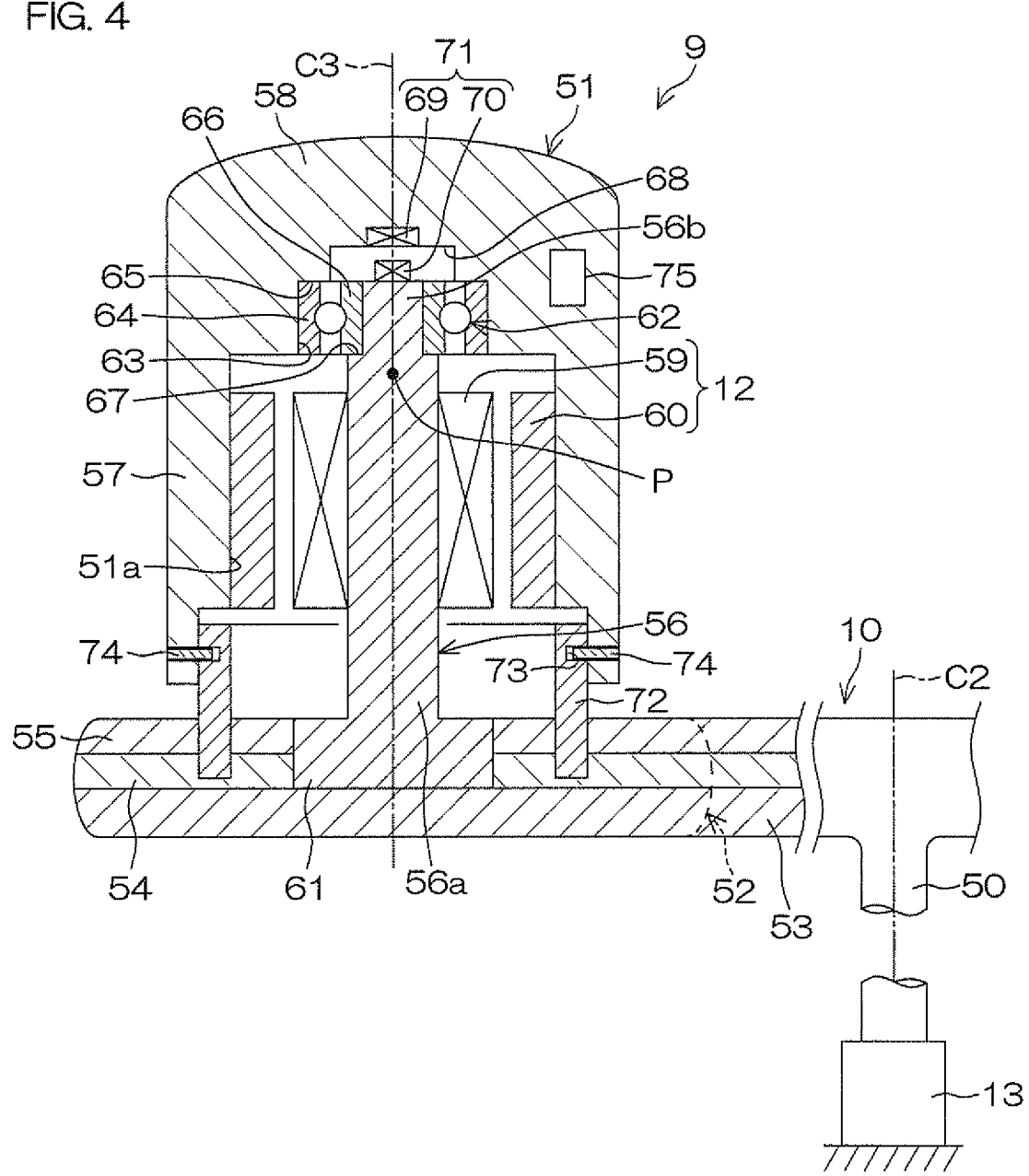
FIG. 4 is a general sectional view of the steering member and a knob.

FIG. 3 is a front view of the steering member 10, and FIG. 4 is a general side view of an essential portion of the steering member 10. Referring to FIG. 3 and FIG. 4, the steering member 10 is joined to the upper end of the inclined steering shaft 50 rotatably integrally. The steering member 10 includes a wheel 52 that supports the knob 51 rotatably, and a plurality of spokes 53 that join the wheel 52 to the upper end of a steering shaft 50.

The knob 51 is disposed so that it is positioned on the left portion of the wheel 52 when the steering member 10 is at a steering neutral position. Usually, a driver operates and rotates the steering member 10 by gripping the knob 51. The knob 51 is rotatable around a knob center C3 parallel to the central axis C2 of the steering member 10 (matching the central axis of the steering shaft 50).

The wheel 52 of the steering member 10 includes an annular core metal 54 joined to the spokes 53 and a cover 55 made of, for example, a synthetic resin covering the core metal 54. To the core metal 54, a knob support shaft 56 as a knob support portion having a central axis matching the knob center C3 is fixed.

The knob 51 has, for example, a tubular hollow shape directed downward. Specifically, the knob 51 includes a tubular portion 57 and an end wall 58 that closes the upper end of the tubular portion 57. Inside the knob 51, the knob reaction force actuator 12 is housed.

The knob support shaft 56 includes a portion disposed higher than the position of the center of gravity P of the knob 51. Specifically, the other end 56b of the knob support shaft 56 is equivalent to the portion disposed higher than the position of the center of gravity P.

The knob reaction force actuator 12 includes a stator 59 fixed to the outer periphery of the knob support shaft 56 and a rotor 60 that surrounds the stator 59 and is fixed to the inner periphery 51a (the inner periphery of the tubular portion 57) of the knob 51.

The knob support shaft 56 has a large diameter base 61 on one end 56a, and the base 61 is fixed to the core metal 54 of the wheel 52. The other end 56b having a small diameter of the knob support shaft 56 supports the knob 51 rotatably via a bearing 62.

The bearing 62 is held on a bearing holding portion 63 provided on the end wall 58 of the knob 51. The outer race 64 of the bearing 62 is restricted from moving in the axial direction with respect to the knob 51 by contact with a positioning stepped portion 65 on one end of the bearing holding portion 63. On the other hand, the inner race 66 of the bearing 62 is restricted from moving in the axial direction with respect to the knob support shaft 56 by contact with a positioning stepped portion 67 on the other end 56b of the knob support shaft 56. Accordingly, the knob 51 is restricted from moving to the one end 56a side of the knob support shaft 56.

On the end wall 58 of the knob 51, a recess 68 facing to the end face of the other end 56b of the knob support shaft 56 is provided. A movable portion 69 fixed to the bottom of the recess 68 and a fixed portion 70 fixed to the end face of the other end 56b of the knob support shaft 56 and facing to the movable portion 69 constitute a knob rotation angle sensor 71 as a knob rotation angle detection device for detecting a rotating position (knob rotation angle $\theta_N$) of the knob 51 around the knob center C3. As the knob rotation angle sensor 71, for example, a rotary encoder that detects a relative rotation amount between the movable portion 69 and the fixed portion 70 can be used.

To the core metal 54 of the wheel 52 of the steering member 10, a guide tube 72 centered on the knob center C3 is fixed. The inner periphery of the tubular portion 57 of the knob 51 is fitted rotatably to the outer periphery of the guide tube 72. On the outer periphery of the guide tube 72, a guide groove 73 consisting of a circumferential groove is formed, and a pin 74 penetrating through and fixed to the tubular portion 57 of the knob 51 is engaged with the guide groove 73. The pin 74 is rotatable in the circumferential direction of the guide tube 72 along the guide groove 73. The pin 74 also functions as a stopper pin to prevent the knob 51 from coming off the guide tube 72.

Inside the knob 51, as a grip detection device for detecting gripping on the knob 51 by a driver, a grip sensor 75 consisting of, for example, an electrostatic sensor is disposed. When a driver grips the knob 51, based on a change in electrostatic capacitance, the grip sensor 75 outputs a signal to the ECU 100. A power supply wire of the knob reaction force actuator 12 including signal lines of the knob rotation angle sensor 71 and the grip sensor 75 and an electric motor is guided to the outside of the knob 51 by using a known slip ring, etc.

Figure 5:
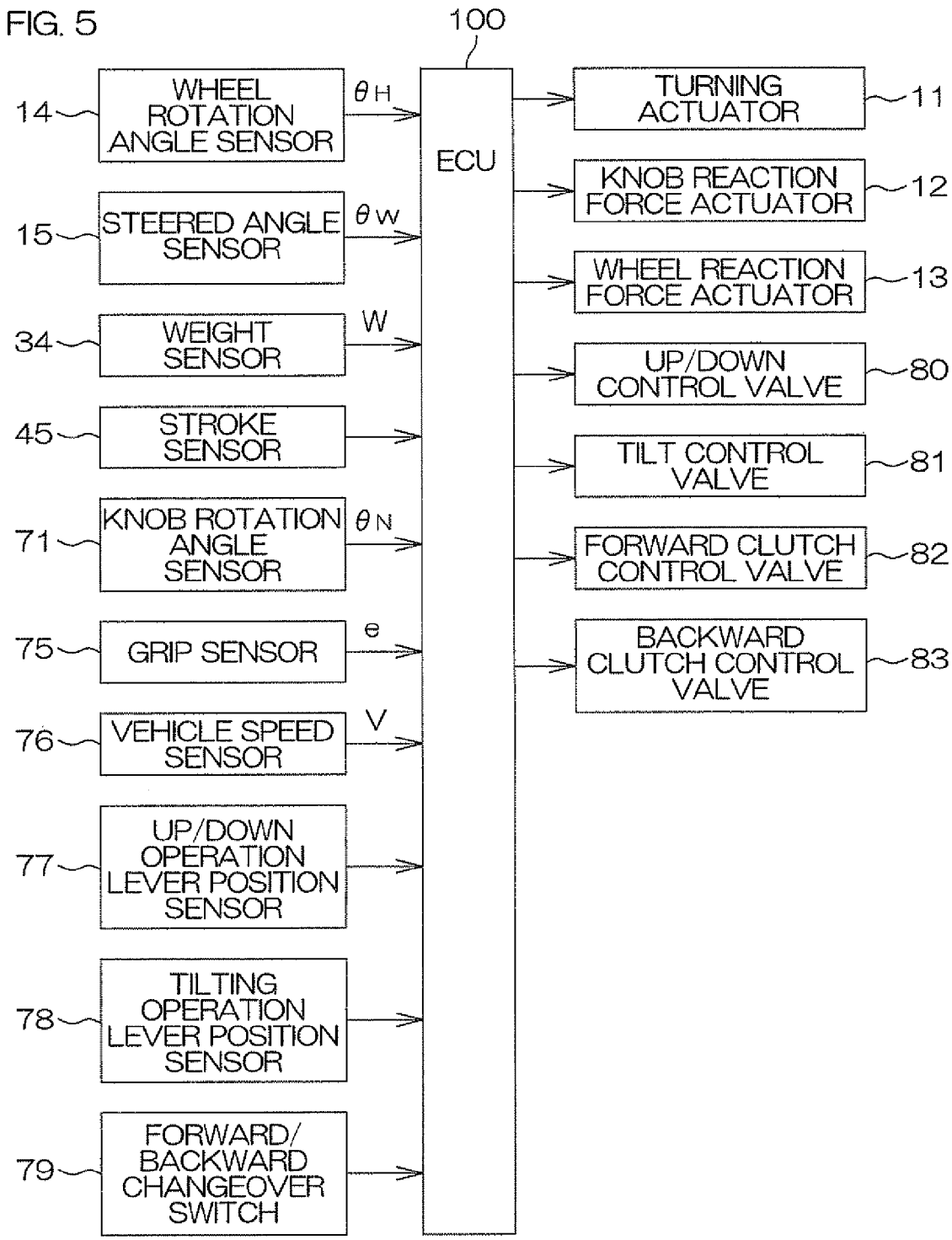
FIG. 5 is a block diagram showing electric configuration of the forklift truck.

FIG. 5 is a block diagram showing a main electric configuration of the forklift truck 1. Referring to FIG. 5, into the ECU 100, signals from a wheel rotation angle sensor 14 for detecting a wheel rotation angle $\theta_H$ of the steering member 10, a steered angle sensor 15 for detecting a steered angle $\theta_W$ of the rear wheel 6 as a steered wheel, weight sensors 34 as weight detection device for detecting load weights W on the forks 27 as loading portions, and stroke sensors 45 as loading portion height detection device for detecting loading portion heights H as the heights of the forks 27 as loading portions, are input.

Further, into the ECU 100, signals from the knob rotation angle sensor 71 that detects a knob rotation angle $\theta_N$ around the knob center C3, the grip sensor 75 that detects gripping on the knob 51, a vehicle speed sensor 76 for detecting a vehicle speed V, the up/down operation lever position sensor 77 for detecting a position of the up/down operation lever 36, a tilting operation lever position sensor 78 for detecting a position of the tilting operation lever 37, and a forward/backward changeover switch 79 that is actuated according to switching of the forward/backward switching lever 38, are input.

From the ECU 100, signals are output to the turning actuator 11, the knob reaction force actuator 12, the wheel reaction force actuator 13, an up/down control valve 80 consisting of a solenoid proportional control valve that controls supply of a hydraulic oil from the hydraulic pump 8 to the lift cylinders 31, and a tilt control valve 81 consisting of a solenoid proportional control valve that controls supply of the hydraulic oil from the hydraulic pump 8 to the tilt cylinders 28.

From the ECU 100, signals are output to a forward clutch control valve 82 consisting of a solenoid proportional control valve that controls supply of the hydraulic oil to a hydraulic cylinder for engaging/disengaging the forward clutch, and a backward clutch control valve 83 consisting of a solenoid proportional control valve that controls supply of the hydraulic oil to a hydraulic cylinder for engaging/disengaging the backward clutch.

The ECU 100 performs various controls. For example, the ECU 100 outputs a control signal to the up/down control valve 80 that controls supply of the hydraulic oil from the hydraulic pump 8 to the lift cylinders 31 according to a position of the up/down operation lever 36 input from the up/down operation lever position sensor 77.

The ECU 100 outputs a control signal to the tilt control valve 81 that controls supply of the hydraulic oil from the hydraulic pump 8 to the tilt cylinders 28 according to a position of the tilting operation lever 27 input from the tilting operation lever position sensor 78.

The ECU 100 outputs a control signal to the forward clutch control valve 82 according to switching to forward of the forward/backward changeover switch 79 so that the hydraulic oil from the hydraulic pump 8 is supplied to the hydraulic cylinder for actuating the forward clutch.

The ECU 100 outputs a control signal to the backward clutch control valve 83 according to switching to backward of the forward/backward changeover switch 79 so that the hydraulic oil from the hydraulic pump 8 is supplied to the hydraulic cylinder for actuating the backward clutch.

The ECU 100 may control driving of the knob reaction force actuator 12 (that is, performs reaction force control of the knob reaction force actuator 12) based on a knob rotation angle $\theta_N$ input from the knob rotation angle sensor 71 so as to make the knob reaction force actuator 12 generate a torque for applying a reaction force corresponding to the position of the knob 51 around the knob center C3 to the knob 51.

The ECU 100 may control driving of the wheel reaction force actuator 13 (that is, performs reaction force control of the wheel reaction force actuator 13) based on a wheel rotation angle $\theta_H$ input from the wheel rotation angle sensor 14 so as to make the wheel reaction force actuator 13 generate a torque for applying a steering reaction force corresponding to the wheel rotation angle $\theta_H$ of the steering member 10 to the wheel 52 of the steering member 10.

Figure 6:
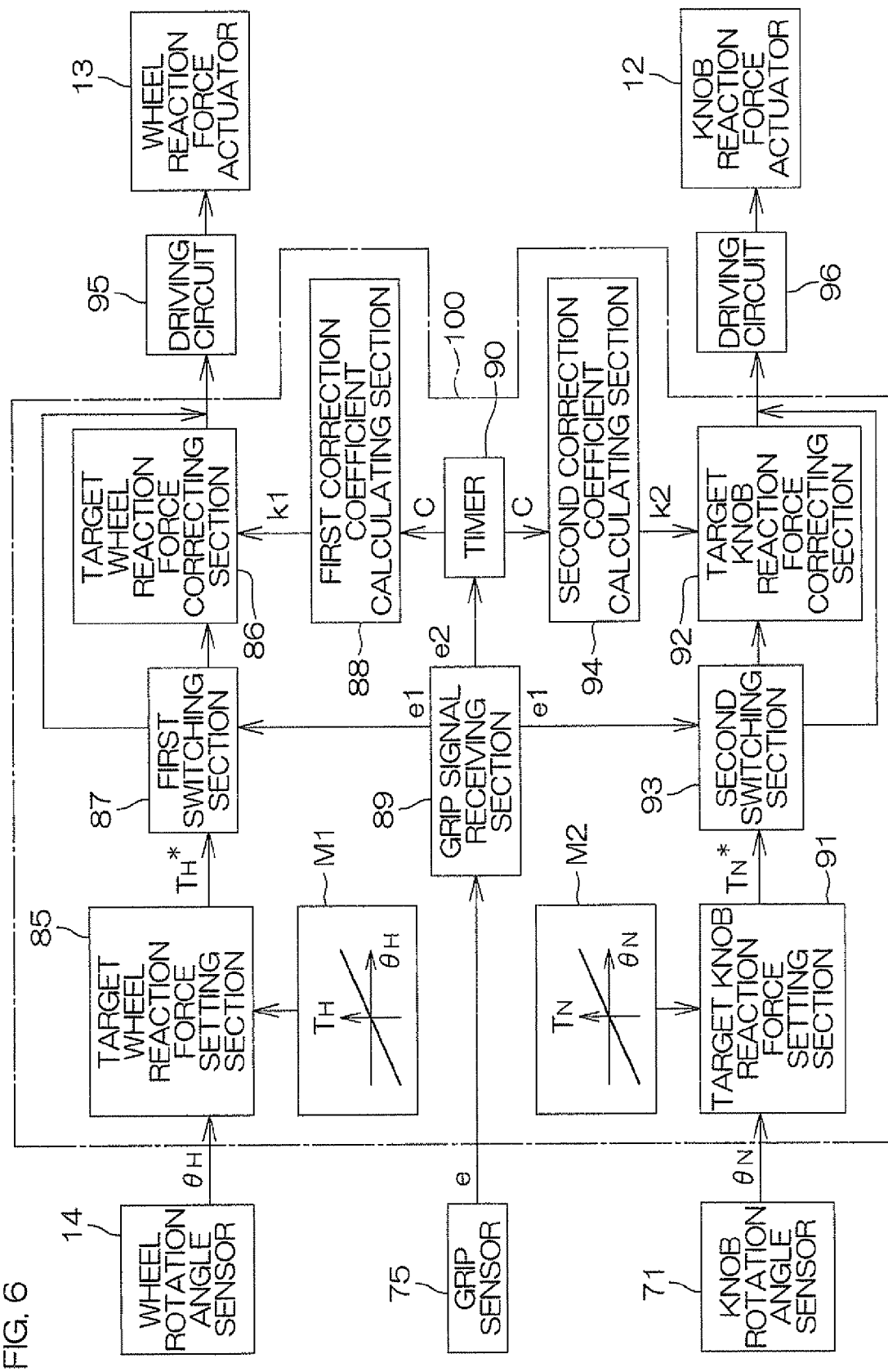
FIG. 6 is a block diagram showing a configuration relating to control of a wheel reaction force actuator and a knob reaction force actuator.

In detail, as shown in FIG. 6, the ECU 100 includes a target wheel reaction force setting section 85 that sets a target wheel reaction force $T_H^*$, a target wheel reaction force correcting section 86 that corrects the target wheel reaction force $T_H^*$, a first switching section 87 interposed between the target wheel reaction force setting section 85 and the target wheel reaction force correcting section 86, a first correction coefficient calculating section 88, a grip signal receiving section 89 that receives an input of a grip signal e from the grip sensor 75, a timer 90 that receives an input of a signal from the grip signal receiving section 89 and measures an elapsed time from the input, a target knob reaction force setting section 91 that sets a target knob reaction force $T_N^*$, a target knob reaction force correcting section 92 that corrects the target knob reaction force $T_N^*$, a second switching section 93 interposed between the target knob reaction force setting section 91 and the target knob reaction force correcting section 92, a second correction coefficient calculating section 94, a driving circuit 95 for driving the wheel reaction force actuator 13, and a driving circuit 96 for driving the knob reaction force actuator 12.

The ECU 100 stores the relationship between the wheel rotation angle $\theta_H$ of the steering member 10 and the wheel reaction force $T_H$ as a wheel rotation angle—wheel reaction force map Ml, and stores the relationship between the knob rotation angle $\theta_N$ and the knob reaction force $T_N$ as a knob rotation angle—knob reaction force map M2.

The target wheel reaction force setting section 85 sets a target wheel reaction force $T_H^*$ based on the input wheel rotation angle $\theta_H$ by using the wheel rotation angle—wheel reaction force map M1 H and outputs it to the first switching section 87. The target knob reaction force setting section 91 sets a target knob reaction force $T_N^*$ based on the input knob rotation angle $\theta_N$ by using the knob rotation angle—knob reaction force map M2 and outputs it to the second switching section 93.

The grip signal receiving section 89 outputs a switch signal e1 to each of the first switching section 87 and the second switching section 93 in response to an input of a grip signal e from the grip sensor 75.

When a switch signal e1 is not input, the first switching section 87 outputs the target wheel reaction force $T_H^*$ to the target wheel reaction force correcting section 86. On the other hand, when a switch signal e1 is input, the first switching section 87 bypasses the target wheel reaction force correcting section 86 and directly outputs the target wheel reaction force $T_H^*$ to the driving circuit 95.

When a switch signal e1 is not input, the second switching section 93 outputs the target knob reaction force $T_N^*$ to the target knob reaction force correcting section 92. On the other hand, when a switch signal e1 is input, the second switching section 93 bypasses the target knob reaction force correcting section 92 and directly outputs the target knob reaction force $T_N^*$ to the driving circuit 96.

In the present preferred embodiment, a predetermined period after detection of gripping on the knob 51 by the grip sensor 75 is a transfer period for gradual transfer from reaction force application only by the wheel reaction force actuator 13 to reaction force application only by the knob reaction force actuator 12.

The grip signal receiving section 89 outputs a timer start command signal e2 to the timer 90 in response to an input of a grip signal e from the grip sensor 75. The timer 90 starts to time the transfer period in response to the input of the timer start command signal e2. Further, the timer 90 outputs a count value C corresponding to a measured time to the first correction coefficient calculating section 88 and the second correction coefficient calculating section 94.

The first correction coefficient calculating section 88 calculates a first correction coefficient k1 based on the following expression (1), and outputs the calculated first correction coefficient k1 to the target wheel reaction force correcting section 86.

$$k1=(C_{MAX}-C)/C_{MAX} \quad (1)$$

Here, $C_{MAX}$ is a maximum count value, and is a count-up value of the timer 90.

The first correction coefficient k1 decreases from 1 as the measured time increases, and reaches zero at the time of counting-up of the timer 90 (that is, when the transfer period from the wheel reaction force application to the knob reaction force application ends).

The target wheel reaction force correcting section 86 multiplies the target wheel reaction force $T_H^*$ input from the first switching section 87 by the first correction coefficient k1 input from the first correction coefficient calculating section 88 to correct the target wheel reaction force $T_H^*$. Specifically, a multiplied value $T_H^* \times k1$ is calculated and is set as a new target wheel reaction force $T_H^*$.

The second correction coefficient calculating section 94 calculates a second correction coefficient k2 based on the following expression (2), and outputs the calculated second correction coefficient k2 to the target knob reaction force correcting section 92.

$$k2=C/C_{MAX} \quad (2)$$

The second correction coefficient k2 increases from zero as the measured time increases, and reaches 1 at the time of counting-up of the timer 90 (that is, when the transfer period from the wheel reaction force application to the knob reaction force application ends).

The target knob reaction force correcting section 92 multiplies the target knob reaction force $T_N^*$ input from the second switching section 93 by the second correction coefficient k2 input from the second correction coefficient calculating section 94 to correct the target knob reaction force $T_N^*$.

Specifically, the multiplied value $T_N^* = k2$ is calculated and is set as a new target knob reaction force $T_N^*$.

Figure 7:
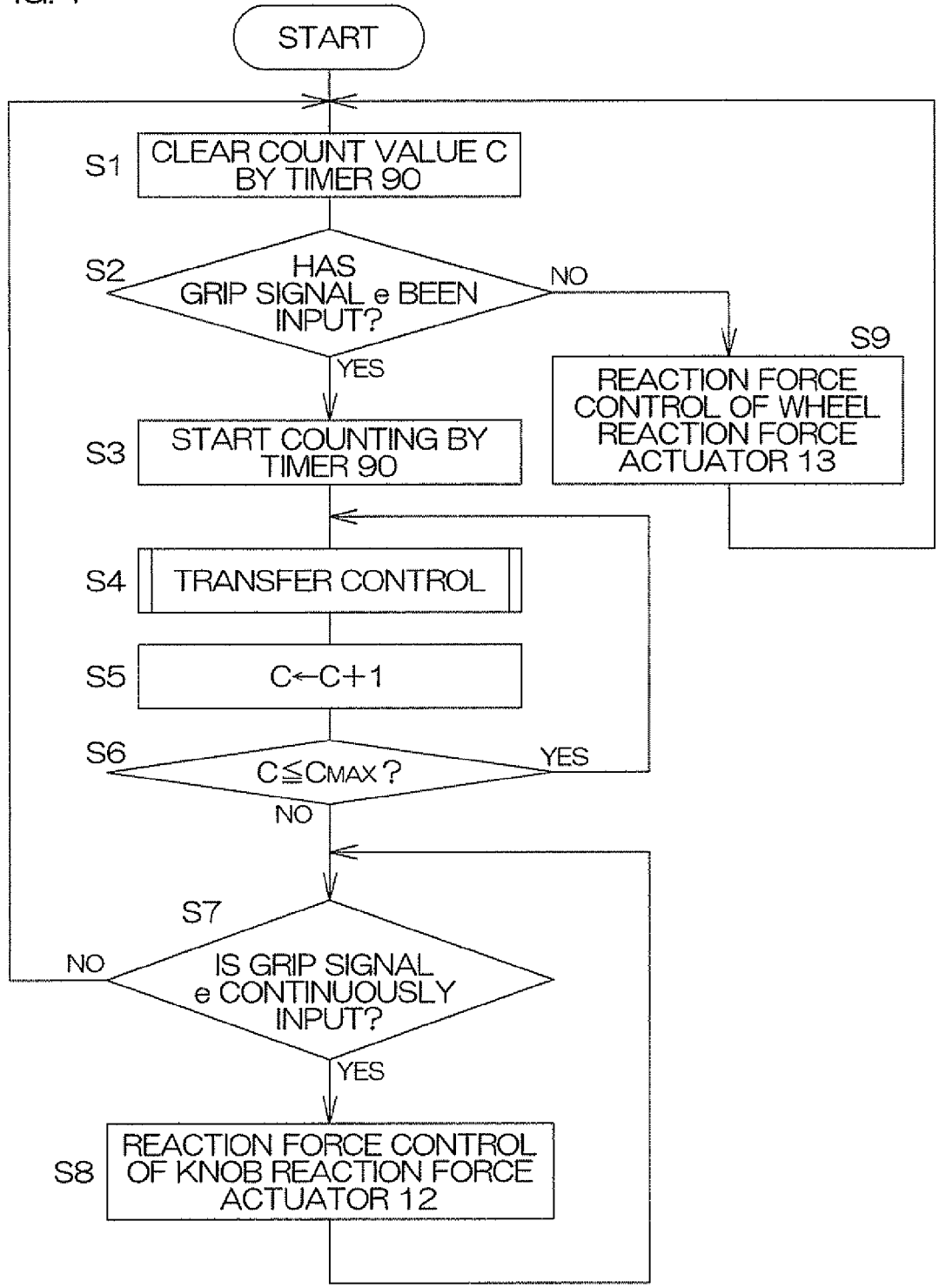
FIG. 7 is a flowchart showing a main flow of control by an ECU.

FIG. 7 is a flowchart showing main operations of the ECU 100. Referring to FIG. 7, the ECU 100 clears the count value C of the timer 90 to 0 in Step S1 first. Next, in Step S2, the ECU 100 determines whether a grip signal 3 is input from the grip sensor 75, and when a grip signal e is not input (NO in Step S1), the knob 51 is not gripped, so that the process advances to Step S9, and while confirming that no grip signal e is input in Step S2 (NO in Step S2), the ECU 100 applies normal reaction force control to the wheel reaction force actuator 13 (Steps S1, S2, and S9).

In Step S2, when it is determined that a grip signal S1 has been input (YES in Step S2), the timer 90 starts counting (Step S3), and a transfer period for gradually switching from the wheel reaction force application to knob reaction force application is set. During this transfer period, Steps S4 to S6 are repeated and transfer control of Step S4 is performed.

In Step S5, the count value C of the timer 90 is incremented by 1, and in Step S6, it is determined whether the count value C is not more than a count-up value $C_{MAX}$ (the transfer period has not ended).

When NO is determined in Step S6 and the transfer period ends, the process advances to Step S7, and it is determined whether the input of the grip signal e is continued, and when the input of the grip signal e is continued (YES in Step S7), the reaction force control of the knob reaction force actuator 12 is continued (Step S8).

While Steps S7 and S8 are repeated, when the input of the grip signal a is ended (NO in Step S7), the process returns to Step S1.

Figure 8:
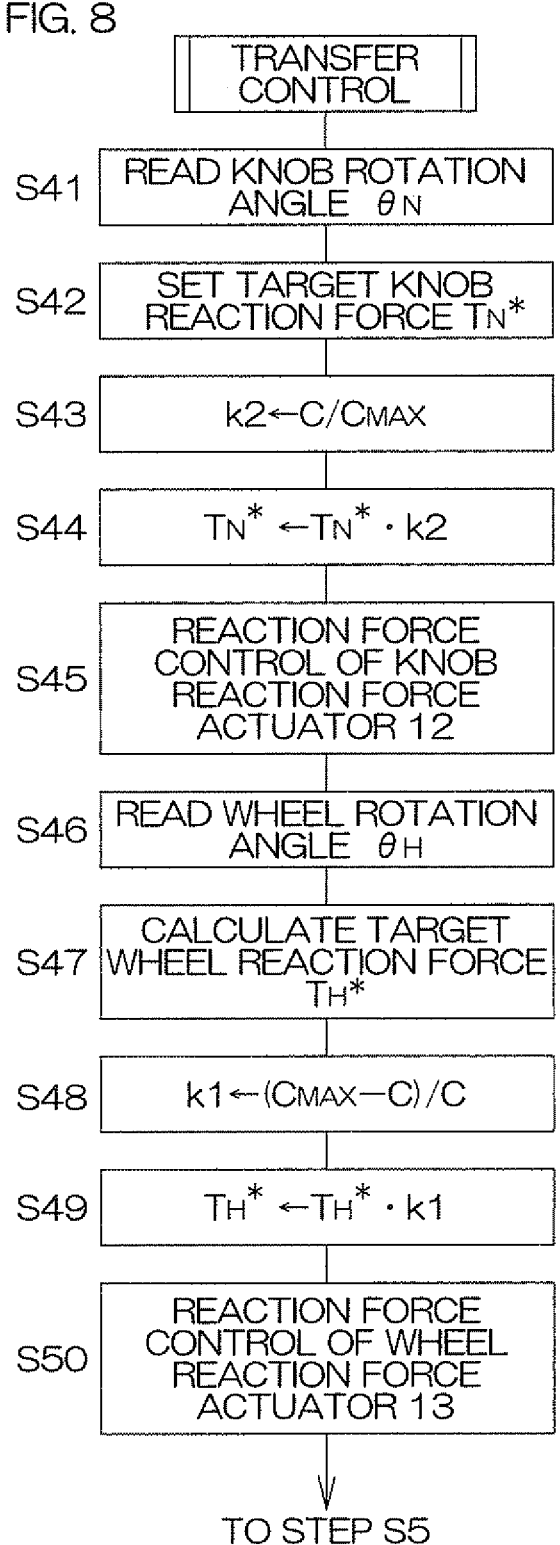
FIG. 8 is a flowchart showing a flow of transfer control.

FIG. 8 shows a flow of transfer control. Referring to FIG. 8, in Step S41, a knob rotation angle $\theta_N$ obtained based on a signal from the knob rotation angle sensor 71 is read, and in Step S42, the target knob reaction force setting section 91 obtains a knob reaction force $T_N$ based on the read knob rotation angle $\theta_N$ by using the map M2, and sets the obtained knob reaction force $T_N$ as a target knob reaction force $T_N^*$.

Next, in Step S43, the second correction coefficient calculating section 94 calculates a second correction coefficient k2 based on the count value C input from the timer 90 by using the expression (2) given above.

Next, in Step S44, a multiplied value $T_N^* \times k2$ is calculated by multiplying the target knob reaction force $T_N^*$ set in Step S42 by the second correction coefficient k2 calculated in Step S43, and is set as a new target knob reaction force $T_N^*$.

Next, in Step S45, based on the target knob reaction force $T_N^*$, driving of the knob reaction force actuator 12 is controlled (that is, reaction force control of the knob reaction force actuator 12 is performed).

Next, in Step S46, a wheel rotation angle $\theta_H$ obtained based on a signal from the wheel rotation angle sensor 14 is read, and in Step S47, a wheel reaction force $T_H$ (equivalent to a steering reaction force) based on the read wheel rotation angle $\theta_H$ is obtained by using the wheel rotation angle—wheel reaction force map M1, and the obtained wheel reaction force $T_H$ is set as a target wheel reaction force $T_H^*$.

Next, in Step S48, the first correction coefficient calculating section 88 calculates a first correction coefficient k1 based on the count value C input from the timer 90 by using the expression (1) given above.

Next, in Step S49, a multiplied value $T_H^* \times k1$ is calculated by multiplying the target wheel reaction force $T_H^*$ set in Step S47 by the first correction coefficient k1 calculated in Step S48, and is set as a new target knob reaction force $T_H^*$.

Next, in Step S50, based on the determined target wheel reaction force $T_H^*$, driving of the wheel reaction force actuator 13 is controlled (that is, reaction force control of the wheel reaction force actuator 13 is performed). After Step S50 ends, the process returns to Step S7 of FIG. 7. The transfer control of Steps S41 to S50 is repeated during the transfer period.

According to the present preferred embodiment, when the steering member 10 is operated while the knob 51 is gripped, the knob 51 rotates (spins) around the knob center C3 according to rotation of the wheel 52 of the steering member 10. The knob reaction force actuator 12 applies a reaction force to the rotation (spinning) of the knob 51, so that a proper steering reaction force can be applied to steering using the knob 51.

In particular, when the driver exchanges the wheel 52 of the steering member 10 for the knob 51 and performs steering, a transfer period in which the knob reaction force is increased with time and the wheel reaction force is reduced with time is provided, so that smooth switching from wheel reaction force application to knob reaction force application is realized. Therefore, a driver does not feel any physical disorder in steering when making an exchange. Specifically, even a driver who is accustomed to a conventional steering feeling feels less physical disorder in steering, so that it becomes easy for a driver to perform the operation.

In the transfer period, the target wheel reaction force $T_H^*$ is gradually reduced by being corrected by multiplication by the first correction coefficient k1 that decreases as the time (count value C) measured by the timer 90 increases, and on the other hand, the target knob reaction force $T_N^*$ is gradually increased by being corrected by multiplication by the second correction coefficient k2 that increases as the time (count value C) measured by the timer 90 increases. Therefore, smooth switching from wheel reaction force application to knob reaction force application is performed in this transfer period.

In detail, when the time measured by the timer 90 reaches the end of the predetermined period, that is, when the count value C counted by the timer 90 reaches the count-up value $C_{MAX}$, the first correction coefficient k1 becomes zero and the second correction coefficient k2 becomes 1, and accordingly, at the end of the transfer period, the wheel reaction force application can be completely switched into knob reaction force application.

The knob support shaft 56 supporting the knob 51 rotatably has the other end 56b as a portion to be disposed higher than the position of the center of gravity P of the knob 51, so that the knob 51 can be prevented from inclining with respect to the knob support shaft 56. Therefore, reaction forces (reaction forces caused by frictional resistance, etc.) other than the reaction force generated by the knob reaction force actuator 12 can be prevented from being generated, and as a result, excellent steering is realized.

Further, when a driver rotates the steering member 10 by gripping the knob 51, the knob 51 rotates (spins) around the knob center C3 with respect to the wheel 52 of the steering member 10 at an angle equal to the rotation angle of the wheel 52 (the wheel rotation angle $\theta_H$) in a direction opposite to the rotation direction of the wheel 52. In the present preferred embodiment, a knob rotation angle sensor 71 that detects a rotation angle of the knob 51 around the knob center C3 is provided, and according to the knob rotation angle $\theta_N$ of the knob 51 around the knob center C3 detected by the knob rotation angle sensor 71, a reaction force to be generated by the knob reaction force actuator 12 is controlled. Accordingly, a reaction force corresponding to the knob rotation angle $\theta_N$ can be applied as a reaction force equivalent to an actual reaction force from a road surface to a driver via the knob 51.

Figure 9:
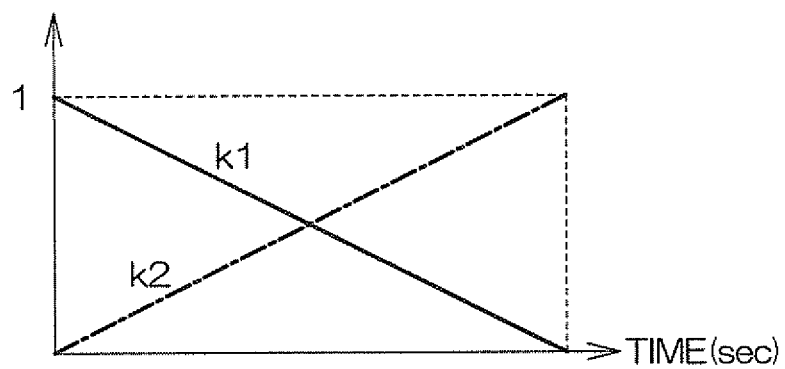
FIG. 9 is a time map of correction coefficients in another preferred embodiment of the present invention.

The present invention is not limited to the above-described preferred embodiment, and for example, in the preferred embodiment described above, the first correction coefficient calculating section 88 and the second correction coefficient calculating section 94 calculate the first correction coefficient k1 and the second correction coefficient by using arithmetic expressions, however, instead of this, as shown in FIG. 9, the correction coefficients may be obtained by using the time maps of the correction coefficients stored in advance.

Further, as the grip sensor 75, a grip sensor consisting of a strain sensor that detects bending of the knob support shaft 56, a grip sensor consisting of a pressure sensor that detects a pressure applied to the surface of the knob 51, or a grip sensor consisting of a push button switch may be used. Alternatively, two or more of these different types of grip sensors may be combined and used.

Further, the knob rotation angle—knob reaction force map M2 of FIG. 6 may be corrected based on at least one of a knob rotation angular speed $\theta_N'$ and a vehicle speed V. In detail, the knob rotation angle—knob reaction force map may be corrected so that the knob reaction force $T_N$ becomes smaller as a knob rotation angular speed $\theta_N'$ obtained by differentiating a knob rotation angle $\theta_N$ acquired from the knob position sensor 71 becomes smaller or as the vehicle speed V acquired from the vehicle speed sensor 76 becomes smaller. In this case, the operability of the knob 51 can be improved.

On the contrary, the knob rotation angle—knob reaction force map M2 may be corrected so that the knob reaction force $T_N$ becomes larger as the knob rotation angle $\theta_N$ acquired by differentiating the knob rotation angular speed $\theta_N'$ acquired from the knob rotation angle sensor 71 becomes larger or as the vehicle speed V acquired from the vehicle speed sensor 76 becomes larger. In this case, the traveling safety of the forklift truck 1 can be improved.

The wheel rotation angle—wheel reaction force map M1 of FIG. 6 may be corrected based on at least one of a wheel rotation angular speed $\theta_H'$ (equivalent to a steering speed) and a vehicle speed V. In detail, the wheel rotation angle—wheel reaction force map M1 may be corrected so that the wheel reaction force $T_H$ becomes smaller as a wheel rotation angular speed $\theta_H'$ obtained by differentiating a wheel rotation angle $\theta_H$ acquired from the wheel rotation angle sensor 14 becomes smaller or as the vehicle speed V acquired from the vehicle speed sensor 76 becomes smaller. In this case, the operability of the steering member 10 can be improved.

On the contrary, the wheel rotation angle—wheel reaction force map M1 may be corrected so that the wheel reaction force $T_H$ becomes larger as a wheel rotation angular speed $\theta_H'$ obtained by differentiating a wheel rotation angle $\theta_H$ acquired from the wheel rotation angle sensor 14 becomes larger or as the vehicle speed V acquired from the vehicle speed sensor 76 becomes larger. In this case, the traveling safety of the forklift truck 1 can be improved.

In the above-described preferred embodiment, an example in which a motor vehicle is a forklift truck as a cargo-handling vehicle is described, however, the present invention is not limited to this, and the present invention is also applicable to a motor vehicle as long as the motor vehicle includes a handle (steering member) with a knob (for example, a vehicle for persons with disabilities).

The present invention is described in detail above based on detailed preferred embodiments, and those skilled in the art who understand the above-described contents may easily conceive modifications, alterations, and equivalents thereto. Therefore, the scope of the present invention should cover the claims and equivalents thereto.

The application of the present invention corresponds to Japanese Patent Application No 2010-230669 filed in Japan Patent Office on Oct. 13, 2010, whole disclosure of which is incorporated herein by reference.

DESCRIPTION OF SYMBOLS

1: Forklift truck (cargo-handling vehicle), 2: Vehicle body, 3: Cargo-handling machine, 6: Rear wheel (steered wheel), 9: Motor vehicle steering system, 10: Steering member, 11: Turning actuator, 12: Knob reaction force actuator, 13: Wheel reaction force actuator, 14: Wheel rotation angle sensor (wheel rotation angle detection device), 51: Knob, 52: Wheel, 56: Knob support shaft, 56*b*: The other end (portion disposed higher than the position of the center of gravity), 71: Knob rotation angle sensor (knob rotation angle detection device), 75: Grip sensor (grip detection device), 85: Target wheel reaction force setting section, 86: Target wheel reaction force correcting section, 87: First switching section, 88: First correction coefficient calculating section, 89: Grip signal receiving section, 90: Timer, 91: Target knob reaction force setting section, 92: Target knob reaction force correcting section, 93: Second switching section, 94: Second correction coefficient calculating section, 95, 96: Driving circuit, 100: ECU (control unit), A1: Turning mechanism, C: Count value, $C_{MAX}$: Count-up value, C2: Wheel center, C3: Knob center, e: Grip signal, e1: Switch signal, e2: Timer start command signal, $\theta_H$: Wheel rotation angle, $\theta_N$: Knob rotation angle, P: Position of the center of gravity, $T_H$: Wheel reaction force, $T_H^*$: Target wheel reaction force, $T_N$: Knob reaction force, $T_N^*$: Target knob reaction force, k1: First correction coefficient, k2: Second correction coefficient

What is claimed is:

1. A motor vehicle steering system comprising:
    a knob for rotating a wheel of a steering member, the knob having a knob center and being supported rotatably around the knob center by the wheel;
    a wheel reaction force actuator that applies a wheel reaction force to rotation of the wheel;
    a knob reaction force actuator that applies a knob reaction force to rotation of the knob;
    a grip detection device that detects gripping on the knob; and
    a control unit that controls the knob reaction force actuator and the wheel reaction force actuator, wherein
    the control unit sets a predetermined period after detection of gripping on the knob by the grip detection device as a transfer period for transfer from reaction force application only by the wheel reaction force actuator to reaction force application only by the knob reaction force actuator, and in this transfer period, increases the knob reaction force with time and reduces the wheel reaction force with time.

2. The motor vehicle steering system according to claim 1, comprising:
    a knob rotation angle detection device that detects a knob rotation angle around the knob center; and
    a wheel rotation angle detection device that detects a wheel rotation angle around a center of the wheel.

3. The motor vehicle steering system according to claim 2, wherein
    the control unit includes:
    a target wheel reaction force setting section that sets a target wheel reaction force based on a wheel rotation angle detected by the wheel rotation angle detection device; and a target knob reaction force setting section that sets a target knob reaction force based on a knob rotation angle detected by the knob rotation angle detection device.

4. The motor vehicle steering system according to claim 3, wherein the control unit includes:

a timer that measures an elapsed time from detection of gripping by the grip detection device;

a target wheel reaction force correcting section that corrects the target wheel reaction force by multiplying the target wheel reaction force by a first correction coefficient that decreases as the measured time of the timer increases; and a target knob reaction force correcting section that corrects the target knob reaction force by multiplying the target knob reaction force by a second correction coefficient that increases as the measured time of the timer increases.

5. The motor vehicle steering system according to claim 4, wherein when the measured time of the timer reaches an end of the predetermined period, the first correction coefficient becomes zero, and the second correction coefficient becomes 1.

6. The motor vehicle steering system according to claim 1, comprising:

a knob support shaft that is supported by the wheel and supports the knob rotatably, wherein the knob support shaft includes a portion disposed higher than a position of a center of gravity of the knob.

\* \* \* \* \*